(12) United States Patent
Dufeutrelle

(10) Patent No.: US 7,784,052 B2
(45) Date of Patent: Aug. 24, 2010

(54) TERMINAL WITH MEANS OF PROTECTION AGAINST MALFUNCTIONS OF CERTAIN JAVA APPLICATIONS

(75) Inventor: Laurent Dufeutrelle, Precy/Oise (FR)

(73) Assignee: Alcatel Lucent, Paris (FR)

( * ) Notice: Subject to any disclaimer, the term of this patent is extended or adjusted under 35 U.S.C. 154(b) by 1646 days.

(21) Appl. No.: 11/014,780

(22) Filed: Dec. 20, 2004

(65) Prior Publication Data

US 2005/0165882 A1 Jul. 28, 2005

(30) Foreign Application Priority Data

Dec. 23, 2003 (FR) .................................. 03 15437

(51) Int. Cl.
- G06F 9/46 (2006.01)
- G06F 9/455 (2006.01)
- G06F 11/00 (2006.01)
- G06F 9/44 (2006.01)
- G06F 9/445 (2006.01)
- G06F 15/16 (2006.01)
- H04W 24/00 (2009.01)

(52) U.S. Cl. ............................. 718/104; 718/1; 714/25; 714/38; 726/4; 726/6; 717/120; 717/124; 717/174; 455/423

(58) Field of Classification Search .................. 718/104, 718/1; 717/174, 176, 177, 178, 120, 124; 726/22, 23, 4, 6; 709/104; 712/202; 455/423; 714/25, 38

See application file for complete search history.

(56) References Cited

U.S. PATENT DOCUMENTS

| | | | | |
|---|---|---|---|---|
| 4,972,314 A | * | 11/1990 | Getzinger et al. | 711/149 |
| 5,257,373 A | * | 10/1993 | Kurihara et al. | 717/124 |
| 5,386,565 A | * | 1/1995 | Tanaka et al. | 717/128 |
| 5,956,481 A | * | 9/1999 | Walsh et al. | 726/23 |
| 6,075,863 A | * | 6/2000 | Krishnan et al. | 713/191 |
| 6,950,923 B2 | * | 9/2005 | O'Connor et al. | 712/202 |
| 7,017,187 B1 | * | 3/2006 | Marshall et al. | 726/24 |
| 7,287,278 B2 | * | 10/2007 | Liang | 726/22 |
| 7,290,283 B2 | * | 10/2007 | Copeland, III | 726/25 |
| 7,334,264 B2 | * | 2/2008 | Takahashi | 726/24 |
| 7,373,106 B2 | * | 5/2008 | Ikeda | 455/26.1 |
| 7,389,341 B2 | * | 6/2008 | Cornelius et al. | 709/224 |
| 7,461,398 B2 | * | 12/2008 | Aaron | 726/6 |
| 7,490,081 B2 | * | 2/2009 | Best et al. | 1/1 |
| 2002/0013910 A1 | | 1/2002 | Edery et al. | |
| 2002/0160752 A1 | | 10/2002 | Hook et al. | |

(Continued)

OTHER PUBLICATIONS

Binder et al, "Using a Secure Java Micro-Kernel on Embedded Devices for the Reliable Execution of Dynamically Uploaded Applications", Springer-Verlag Berlin Heidelberg, 2002, pp. 125-135.*

*Primary Examiner*—Meng-Ai An
*Assistant Examiner*—Jennifer N To
(74) *Attorney, Agent, or Firm*—Fay Sharpe LLP

(57) ABSTRACT

A terminal comprising resources, a terminal for downloading an application program, wherein the application program is stored in the terminal, and wherein the terminal further comprises a device layer for detecting if the application program activates at least one function endangering at least one resource of the terminal. The device layer determines if the number of activations during a predetermined time period is greater than a predetermined value, and the terminal deletes the application program from the terminal in this case.

16 Claims, 1 Drawing Sheet

U.S. PATENT DOCUMENTS

| | | | |
|---|---|---|---|
| 2002/0188649 A1* | 12/2002 | Karim | 709/104 |
| 2004/0034794 A1* | 2/2004 | Mayer et al. | 713/200 |
| 2004/0143749 A1* | 7/2004 | Tajalli et al. | 713/200 |
| 2005/0132230 A1* | 6/2005 | Miclea et al. | 713/201 |
| 2005/0257265 A1* | 11/2005 | Cook et al. | 726/23 |
| 2005/0257266 A1* | 11/2005 | Cook et al. | 726/23 |
| 2006/0090198 A1* | 4/2006 | Aaron | 726/6 |

\* cited by examiner

TERMINAL WITH MEANS OF PROTECTION AGAINST MALFUNCTIONS OF CERTAIN JAVA APPLICATIONS

CROSS-REFERENCE TO RELATED APPLICATIONS

This application is based on French Patent Application No. 03 15 437 filed 23 Dec. 2003, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a mobile radio terminal that is not sensitive to defective application programs.

2. Description of the Prior Art

One non-exclusive field of application of the invention is that of mobile radio terminals operating in a mobile radio system. The invention applies particularly, although not exclusively, to a system or network conforming to the GSM (Global System for Mobile communications), DCS, PCS or UMTS standard.

A mobile radio terminal comprises different types of resources that are indispensable to its operation, such as a man-machine interface comprising, for example, a keypad and a display screen, which may be back-lit, and such as various memories for storing data inherent to the operation of the terminal.

These memories include a non-volatile "flash memory" which is non-volatile even if the terminal is no longer supplied with power, which for example enables the time and the date to be held in memory and shown to the user when the latter switches his terminal on again.

In recent mobile radio terminals, it is possible to download from the terminal's mobile radio network application programs written in the programming language Java.

These Java application programs, such as games, for example, enable users to play games that are not prestored in their terminal by the manufacturer.

If these Java application programs are executed in the terminal, they use the various resources of the terminal, including the flash memory and/or the back-lighting of the keypad and/or of the display screen, for example.

However, certain Java application programs are defective, and are sometimes made intentionally defective by the designer.

These defects can cause irreversible damage to the resources of the terminal and render it unusable.

An object of the invention is to offer a solution for preventing defective Java application programs damaging the resources of the terminal.

SUMMARY OF THE INVENTION

To this end, the invention provides a terminal comprising resources, means for downloading an application program, means for storing the application program in the terminal, wherein the terminal further comprises means for detecting if the application program activates at least one function endangering at least one resource of the terminal, means for determining if the number of activations during a predetermined time period is greater than a predetermined value, and means for deleting the application program from the terminal in this case.

A terminal of the invention may be a radio pager, a personal digital assistant (PDA), a GSM850, GSM900, DCS (Digital Communication System) or UMTS (Universal Mobile Telecommunications System) terminal, or a DECT (Digital European Cordless Telecommunications) telephone, and the terminal may further incorporate 1.5 GHz GPS (Global Positioning System) or 2.5 GHz Wi-Fi (Wireless Fidelity) functions.

Other features and advantages of the invention will emerge from the following description of one particular embodiment of the invention, which is given by way of illustrative and non-limiting example, and from the appended drawing.

DETAILED DESCRIPTION OF THE PREFERRED EMBODIMENT

Figure 1:
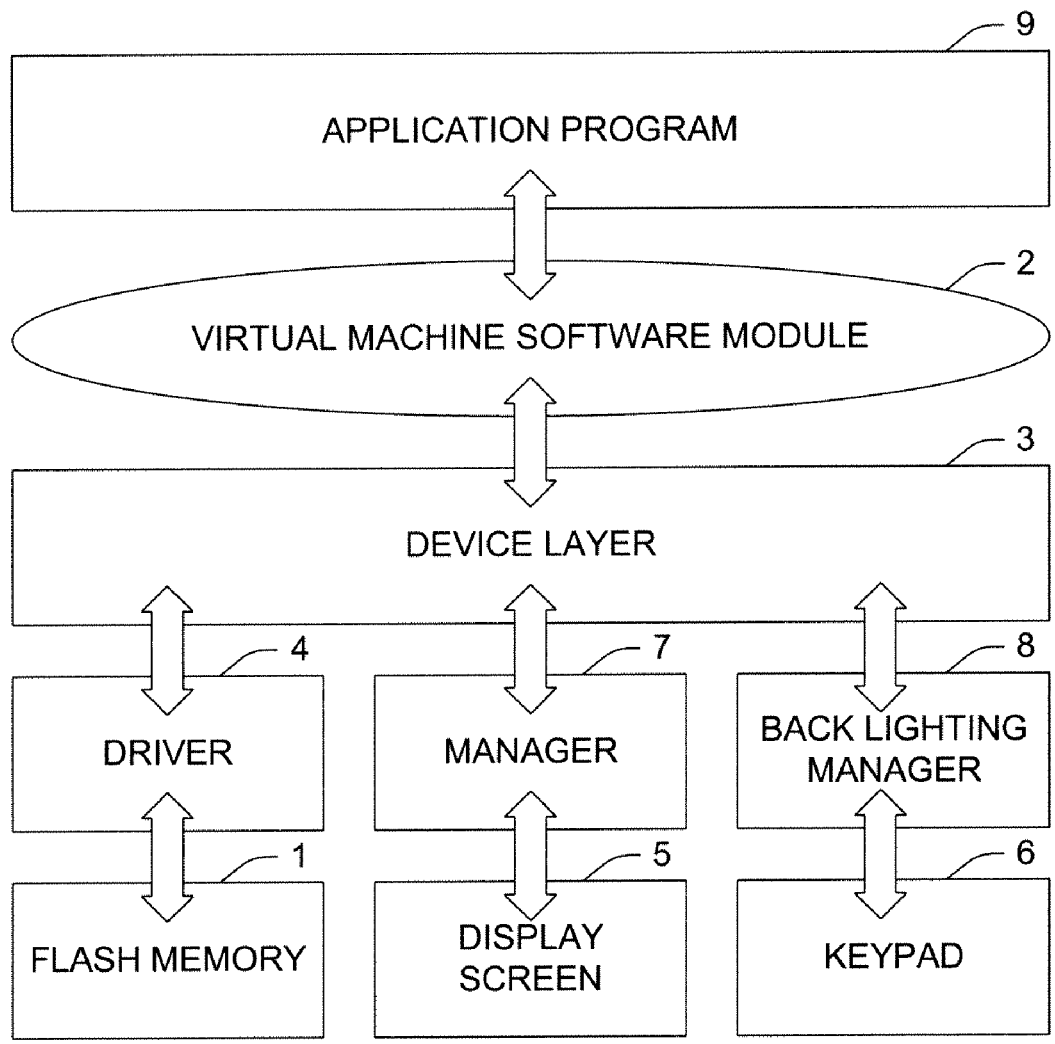
FIG. 1 shows the various program portions constituting an application program 9 that has been downloaded and the flash memory of the terminal of the invention.

The terminal user downloads an application program 9 from the network.

The application program 9 may be a program written in Java or any other computer language.

If the application program 9 is defective, it may activate recurrent functions that may imperil the resources of the terminal.

These resources indispensable for the terminal to operate include the flash memory 1.

The flash memory 1 is driven by a flash driver software module 4.

A certain number of write and erase cycles may destroy the flash memory 1.

For example, after 100 000 write-erase cycles of the flash memory 1, the flash memory of a current terminal will be destroyed and the terminal will be unusable.

In a mobile radio terminal, different program portions are involved in analyzing a Java application program 9 downloaded into the terminal and then running it in the terminal, for example to start the game in the case of an application program 9 constituting a game.

These program portions comprise firstly a virtual machine software module 2.

This virtual machine 2 interprets what the Java application must do, i.e. the instructions of the Java application.

If the Java application requests to store data in the flash memory 1, the virtual machine 2 uses a device layer 3 to access the driver 4 of the flash memory 1.

The device layer 3 is an interface between the virtual machine 2 and the manager 4 of the flash memory 1.

The device layer 3 transmits instructions from the virtual machine 2 to the manager 4 of the flash memory 1.

Finally, the device layer 3 counts down the number of write-erase cycles executed on the flash memory 1 in a predetermined time period.

For example, if this number reaches one tenth of the maximum possible number of cycles, i.e. approximately 10 000 cycles in one day, then the Java application is automatically destroyed after alerting the terminal user.

The warning may consist in the message "Java application XXXX is defective, is causing irreversible damage to your terminal, and will be deleted".

The resources indispensable to the operation of the terminal also include the display screen 5 and the keypad 6, both of which are back-lit.

A certain number of activations of the back-lighting may destroy the keypad 6 and the display screen 5.

The back-lighting of the keypad 6 and the display screen 5 is controlled by a manager 7 for the back-lighting of the display screen 5 and by a manager 8 for the back-lighting of the keypad 6, respectively.

As in the previous situation, the virtual machine 2 interprets what the Java application must do, i.e. the instructions of the Java application.

If the Java application requests activation of functions such as the recurrent activation of the back-lighting diodes of the keypad 6 and/or the display screen 5, the virtual machine 2 uses a device layer software module 3 to access the back-lighting manager 8 of the keypad 6 and/or the back-lighting manager 7 of the display screen 5.

The device layer 3 is the interface between the virtual machine 2 and the back-lighting manager 7 of the display screen 5 and between the virtual machine 2 and the back-lighting manager 8 of the keypad 6.

The device layer 3 transmits instructions from the virtual machine 2 to the back-lighting managers 7 and 8 of the display screen 5 and the keypad 6, respectively.

Finally, the device layer 3 counts down the number of cycles of activation and deactivation of the back-lighting of the keypad 6 and the display screen 5 executed in a predetermined time period that depends on the characteristics of the keypad 6 and the display screen 5.

If a predetermined number of cycles of activation and deactivation of the back-lighting of the keypad 6 and the display screen 5 depending on the characteristics of the keypad 6 and the display screen 5 is reached, then the Java application is automatically deleted after alerting the terminal user.

The warning may consist in the message "Java application XXXX is defective, is causing irreversible damage to your terminal, and will be deleted".

There is claimed:

1. A terminal comprising;
resources;
means for downloading an application program;
means for storing said application program in said terminal;
means for detecting if said application program activates at least one function endangering at least one resource of said terminal;
means for determining if a number of activation-deactivation cycles of the at least one function during a predetermined time period is greater than a predetermined value stored in the means for determining; and
means for deleting said application program from said terminal when the number of activations is greater than the predetermined value in order to prevent damage to the at least one resource due to recurrent activations of the at least one function;
wherein the means for detecting and the means for determining are integrated into a device layer;
wherein the device layer constitutes an interface between resource managers of said terminal and said application program; and
wherein the predetermined value is a fraction of a maximum possible number of cycles of the at least one function being activated by the application program.

2. The terminal claimed in claim 1 wherein said resources of said terminal are a non-volatile flash memory and/or a back-lit display screen and/or a back-lit keypad.

3. The terminal claimed in claim 2 further comprising a virtual machine software module for interpreting instructions of said application program.

4. The terminal claimed in claim 3 wherein said virtual machine uses said device layer to access said back-lighting of said display screen via a back-lighting manager of said display screen.

5. The terminal claimed in claim 3 wherein said virtual machine uses said device layer to access said back-lighting of said keypad via a back-lighting manager of said keypad.

6. The terminal claimed in claim 3 wherein said virtual machine uses said device layer to access said flash memory via a flash memory manager.

7. The terminal according to claim 1, wherein the application program is a JAVA application program.

8. The terminal according to claim 1, wherein the predetermined value is approximately one-tenth of maximum possible number of cycles of the resource.

9. A radio communication terminal comprising: resources;
means for downloading an application program;
means for storing said application program in said terminal;
means for detecting if said application program activates at least one function endangering at least one resource of said terminal;
means for determining if a number of activation-deactivation cycles during a predetermined time period is greater than a predetermined value; and
means for deleting said application program from said terminal in this case, wherein the means for detecting and the means for determining are integrated into a device layer;
wherein the predetermined value is a fraction of a maximum possible number of cycles of the at least one function being activated by the application program; and
wherein the device layer constitutes an interface between resource managers of said terminal and said application program.

10. The radio communication terminal according to claim 9, wherein the application program is a JAVA application program.

11. The radio communication terminal according to claim 9, wherein:
said resources of said terminal are at least one of a non-volatile flash memory, a back-lit display screen, and a back-lit keypad.

12. The radio communication terminal according to claim 9, further comprising;
a virtual machine software module for interpreting instructions of said application program;
wherein the virtual machine at least one of:
uses the device layer to access said back-lighting of said display screen via a back-lighting manager of said display screen;
uses said device layer to access said back-lighting of said keypad via a back-lighting manager of said keypad; and
uses said device layer to access said flash memory via a flash memory manager.

13. A personal digital assistant comprising;
resources;
means for downloading an application program;
means for storing said application program in said terminal;
means for detecting if said application program activates at least one function endangering at least one resource of said terminal;

means for determining if a number of activation-deactivation cycles during a predetermined time period is greater than a predetermined value; and means for deleting said application program from said terminal in this case, wherein the means for detecting and the means for determining are integrated into a device layer;

wherein the predetermined value is a fraction of a maximum possible number of cycles of the at least one function being activated by the application program; and wherein the device layer constitutes an interface between resource managers of said terminal and said application program.

14. The personal digital assistant according to claim 13, wherein the application program is a JAVA application program.

15. The personal digital assistant according to claim 13, wherein:

said resources of said terminal are at least one of a non-volatile flash memory, a back-lit display screen, and a back-lit keypad.

16. The personal digital assistant according to claim 13, further comprising;

a virtual machine software module for interpreting instructions of said application program;

wherein the virtual machine at least one of:

uses the device layer to access said back-lighting of said display screen via a back-lighting manager of said display screen;

uses said device layer to access said back-lighting of said keypad via a back-lighting manager of said keypad; and uses said device layer to access said flash memory via a flash memory manager.

\* \* \* \* \*